United States Patent
Ariyoshi et al.

(10) Patent No.: US 12,123,074 B2
(45) Date of Patent: Oct. 22, 2024

(54) METHOD FOR DISSOLVING LITHIUM COMPOUND, METHOD FOR MANUFACTURING LITHIUM CARBONATE, AND METHOD FOR RECOVERING LITHIUM FROM LITHIUM ION SECONDARY CELL SCRAP

(71) Applicant: JX METALS CIRCULAR SOLUTIONS CO., LTD., Tokyo (JP)

(72) Inventors: Hirotaka Ariyoshi, Hitachi (JP); Isao Tomita, Hitachi (JP); Hiroshi Abe, Hitachi (JP)

(73) Assignee: JX METALS CIRCULAR SOLUTIONS CO., LTD., Tokyo (JP)

( * ) Notice: Subject to any disclaimer, the term of this patent is extended or adjusted under 35 U.S.C. 154(b) by 0 days.

(21) Appl. No.: 18/315,623

(22) Filed: May 11, 2023

(65) Prior Publication Data

US 2023/0279522 A1    Sep. 7, 2023

Related U.S. Application Data

(63) Continuation of application No. 16/635,964, filed as application No. PCT/JP2018/028929 on Aug. 1, 2018, now Pat. No. 11,718,895.

(30) Foreign Application Priority Data

Aug. 2, 2017  (JP) .................. 2017-150167
Aug. 2, 2017  (JP) .................. 2017-150168

(51) Int. Cl.
  *C22B 26/12*   (2006.01)
  *B09B 3/80*    (2022.01)
  (Continued)

(52) U.S. Cl.
  CPC ............. *C22B 26/12* (2013.01); *B09B 3/80* (2022.01); *C01D 15/08* (2013.01); *C22B 1/02* (2013.01);
  (Continued)

(58) Field of Classification Search
  CPC .. C22B 26/12; C22B 1/02; C22B 3/06; C22B 3/44; C22B 3/04; C22B 7/00;
  (Continued)

(56) References Cited

U.S. PATENT DOCUMENTS

2004/0005267 A1    1/2004  Boryta et al.

FOREIGN PATENT DOCUMENTS

CN    102432043 A    5/2012
CN    106340692 A    1/2017
(Continued)

OTHER PUBLICATIONS

Advisory Action issued Mar. 1, 2023, in corresponding U.S. Appl. No. 16/635,964.
(Continued)

*Primary Examiner* — Daniel S Gatewood
(74) *Attorney, Agent, or Firm* — Birch, Stewart, Kolasch & Birch, LLP

(57) ABSTRACT

A method for dissolving a lithium compound according to the present invention includes bringing a lithium compound into contact with water or an acidic solution, and feeding, separately from the lithium compound, a carbonate ion to the water or the acidic solution to produce carbonic acid, and allowing the carbonic acid to react with the lithium compound to produce lithium hydrogen carbonate.

7 Claims, 4 Drawing Sheets

(51) Int. Cl.

| | |
|---|---|
| *C01D 15/08* | (2006.01) |
| *C22B 1/02* | (2006.01) |
| *C22B 3/06* | (2006.01) |
| *C22B 3/44* | (2006.01) |
| *H01M 10/0525* | (2010.01) |
| *H01M 10/54* | (2006.01) |

(52) U.S. Cl.
CPC .................. *C22B 3/06* (2013.01); *C22B 3/44* (2013.01); *H01M 10/0525* (2013.01); *H01M 10/54* (2013.01); *C01P 2002/72* (2013.01); *C01P 2006/40* (2013.01)

(58) Field of Classification Search
CPC .. C22B 7/006; B09B 3/80; B09B 3/00; C01D 15/08; C01D 7/26; C01D 7/10; C01D 7/00; C01D 7/07; H01M 10/0525; H01M 10/54; C01P 2002/72; C01P 2006/40; Y02E 60/10; Y02P 10/20; Y02W 30/84
See application file for complete search history.

(56) References Cited

FOREIGN PATENT DOCUMENTS

| | | | | |
|---|---|---|---|---|
| JP | 11-310414 | A | 11/1999 | |
| JP | 2009-57278 | A | 3/2009 | |
| JP | 4581553 | B2 | 11/2010 | |
| JP | 2012-91999 | A | 5/2012 | |
| JP | 2012091999 | A * | 5/2012 | ............ C01D 15/08 |
| JP | 5535717 | B2 | 7/2014 | |
| JP | 2016-194105 | A | 11/2016 | |
| JP | 2018-145473 | A | 9/2018 | |
| RU | 2013 151 413 | A | 5/2015 | |
| WO | WO-2010131664 | A1 * | 11/2010 | ............ C01D 15/08 |
| WO | WO2013/036983 | A1 | 3/2013 | |

OTHER PUBLICATIONS

Extended European Search Report dated Jul. 2, 2020 for Application No. 20159892.7.
Extended European Search Report, dated Dec. 7, 2020, for corresponding European Application No. 18841812.3.
International Preliminary Report on Patentability and English translation of the Written Opinion of the International Searching Authority (forms PCT/IB/373, PCT/ISA/237 and PCT/IB/338), dated Feb. 13, 2020 for corresponding International Application No. PCT/JP2018/028929.
International Search Report for PCT/JP2018/028929 (PCT/ISA/210) mailed on Oct. 9, 2018.
Notice of Allowance issued Mar. 21, 2023, in corresponding U.S. Appl. No. 16/635,964.
Office Action issued Jul. 27, 2022, in corresponding U.S. Appl. No. 16/635, 964.
Office Action issued Nov. 17, 2022, in corresponding U.S. Appl. No. 16/635,964.
Restriction Requirement issued May 31, 2022, in corresponding U.S. Appl. No. 16/635,964.
Sun et al., "Vacuum Pyrolysis and Hydrometallurgical Process for the Recovery of Valuable Metals from Spent Lithium-Ion Batteries," Journal of Hazardous Materials, vol. 194, Available online Aug. 9, 2011, (Jul. 30, 2011), pp. 378-384, XP028314172.

* cited by examiner

[FIG. 1]
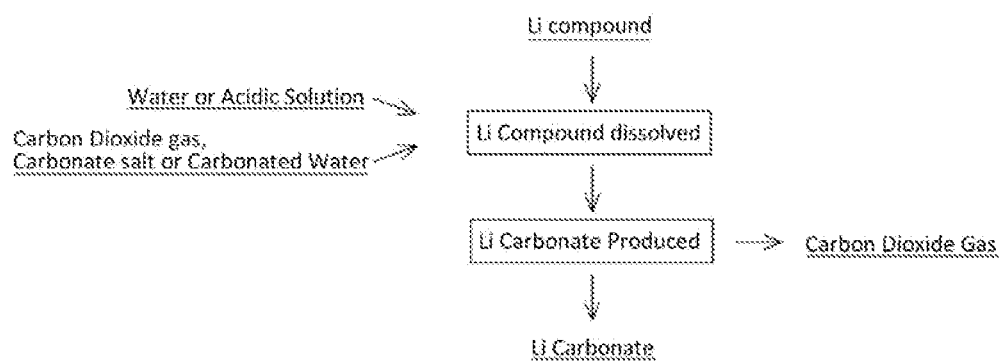

[FIG. 2]
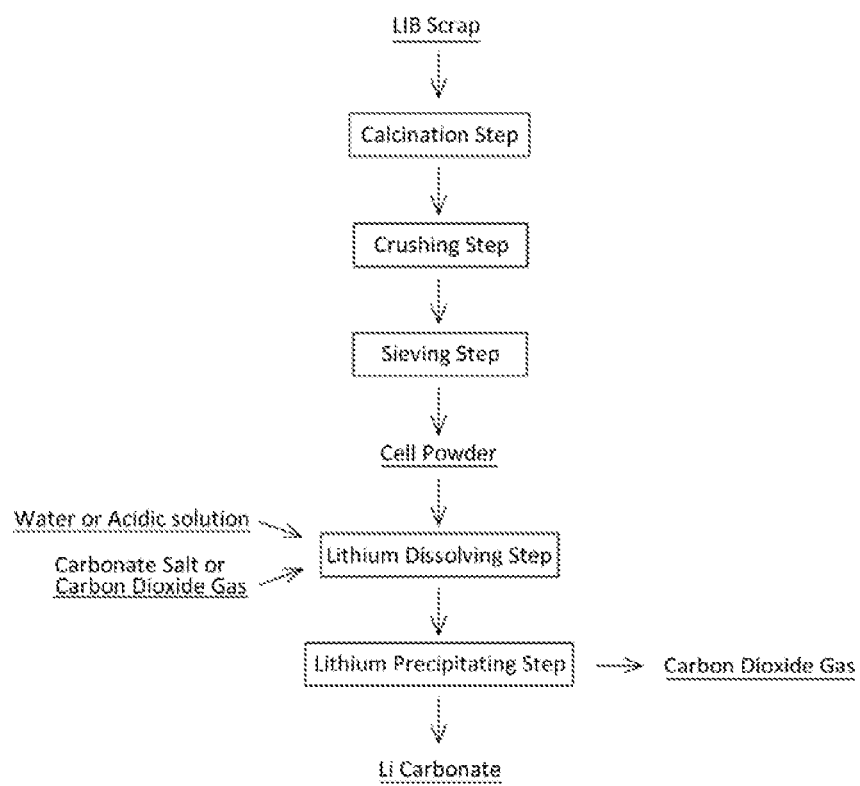

[FIG. 3]
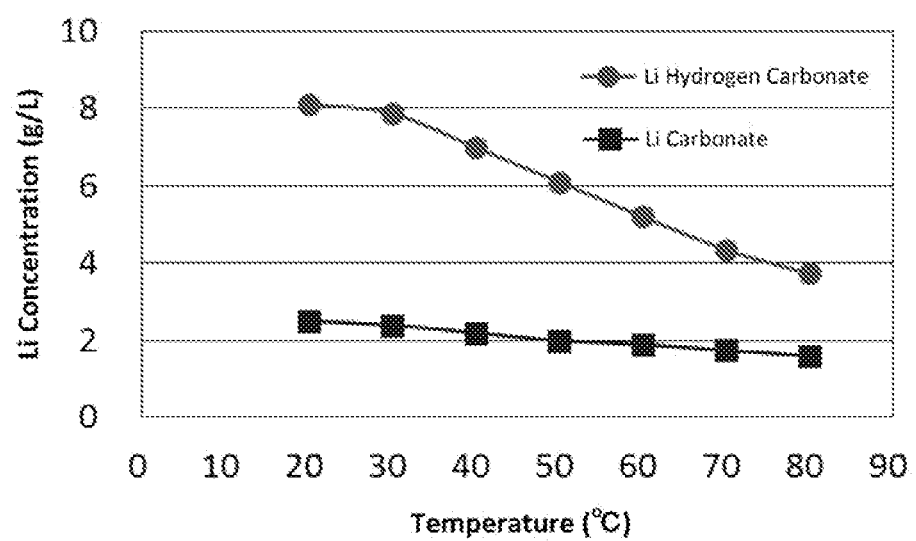

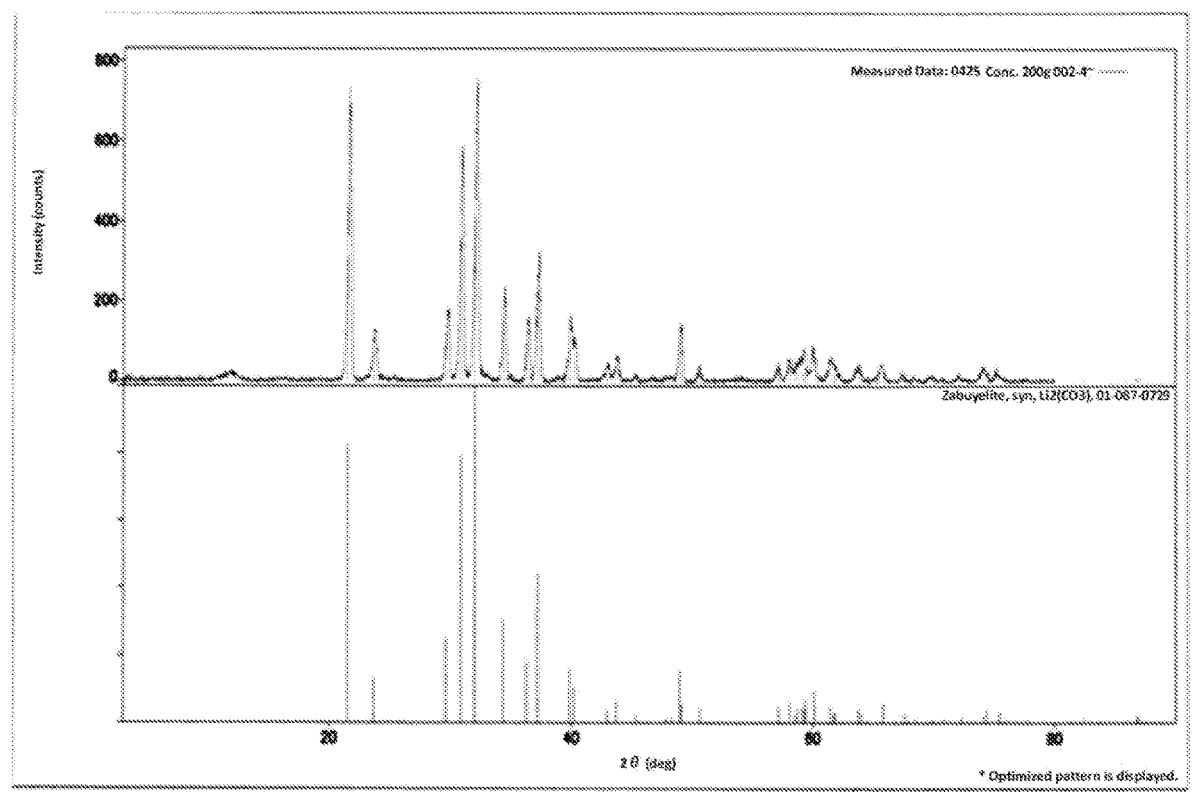
[FIG. 4]

METHOD FOR DISSOLVING LITHIUM COMPOUND, METHOD FOR MANUFACTURING LITHIUM CARBONATE, AND METHOD FOR RECOVERING LITHIUM FROM LITHIUM ION SECONDARY CELL SCRAP

CROSS-REFERENCE TO RELATED APPLICATIONS

This application is a Continuation of co-pending application Ser. No. 16/635,964, filed on Jan. 31, 2020, which is the National Phase under 35 U.S.C. § 371 of International Application No. PCT/JP2018/028929, filed on Aug. 1, 2018, which claims the benefit under 35 U.S.C. § 119(a) to Patent Application Nos. 2017-150167 and 2017-150168, both filed in Japan on Aug. 2, 2017, all of which are hereby expressly incorporated by reference into the present application.

TECHNICAL FIELD

The present invention relates to a method for dissolving a lithium compound and a method for manufacturing lithium carbonate using the same. More particularly, the present invention proposes to a technique capable of effectively dissolving a lithium compound and contributing to production of high-quality lithium carbonate.

The present invention also relates to a method for recovering lithium from lithium ion secondary cell scrap, and in particular, proposes a technique capable of effectively recovering lithium contained in lithium ion secondary cell scrap.

BACKGROUND ART

For example, a lithium compound such as lithium carbonate may be obtained in a wet process for recovering a metal from predetermined electric/electronic equipment or other waste. However, when the lithium compound has low lithium quality, the lithium compound may be subjected to a purification treatment in order to increase the quality.

Specifically, the purification treatment involves subjecting the lithium compound to repulp washing and blowing a carbon dioxide gas into it, and then separating impurities such as calcium and magnesium from a solution having dissolved lithium by solid-liquid separation. After performing deacidification and concentration, it is separated into purified lithium carbonate and a filtrate by solid-liquid separation. When the quality of the soluble impurities in the purified lithium carbonate thus obtained is higher, the washing may be further repeated.

The purification treatment as described above may be carried out, for example, when recovering valuable metals such as nickel and cobalt from lithium ion secondary cell scrap by means of a wet process or the like. In recent years, from the viewpoint of effective use of resources, recovery of valuable metals from such lithium ion secondary cell scrap that is discarded for product life and other reasons has been widely studied.

For example, in order to recover valuable metals from lithium ion secondary cell scrap, the lithium ion secondary cell scrap is typically calcined to remove harmful electrolytes and then subjected to crushing and sieving in this order. Subsequently, cell powder obtained under a sieve for the sieving is leached by adding it to an acid leaching solution, whereby lithium, nickel, cobalt, manganese, iron, copper, aluminum and the like which can be contained therein are dissolved in the solution.

Then, iron, copper, aluminum, and the like are removed sequentially or simultaneously among the respective metal elements dissolved in the leached solution to recover valuable metals such as cobalt, manganese and nickel. More particularly, the leached solution is subjected to multiple stages of solvent extraction or neutralization according to the metals to be separated, and further, each solution obtained at each stage is subjected to stripping, electrolysis, carbonation or other treatments. Accordingly, a lithium-containing solution containing lithium ions is obtained.

The lithium-containing solution thus obtained is generally subjected to carbonation by adding a carbonate salt or blowing a carbon dioxide gas to recover a lithium ion contained in the lithium-containing solution as lithium carbonate.

As such a type of technique, Patent Document 1 discloses that a lithium ion is recovered as solid lithium carbonate by adjusting a pH of an aqueous solution containing lithium ions to pH 4 to 10 depending on acidic solvent extracting agent used for extraction of lithium ions, bringing the aqueous solution into contact with the acidic solvent extracting agent to extract lithium ions, and then bringing the solvent extracting agent into contact with an aqueous solution having a pH of 3.0 or less to strip lithium ions, repeating the above stripping operations using the resulting aqueous lithium ion solution to concentrate the lithium ions, and mixing the resulting aqueous high-concentration lithium ion solution with a water-soluble carbonate while maintaining the aqueous high-concentration lithium ion solution at 60° C. or higher.

As described above, when recovering lithium carbonate by carbonation from a lithium-containing solution obtained by subjecting lithium ion secondary cell scrap to various treatments such as acid leaching and solvent extraction, there is a problem that processes for obtaining lithium carbonate are very complicated, thereby increasing equipment costs and leading to poor processing efficiency.

In connection with this, Patent Document 2 proposes "a method for recovering lithium, comprising leaching a calcined product containing lithium oxide in water, the calcined product being obtained by calcining a mixture of one part by mass or more of carbon with 100 parts by mass of lithium cobalt oxide in any of an air atmosphere, an oxidizing atmosphere, and a reducing atmosphere. It also discloses that according to this method, "it is possible to provide a lithium recovery method capable of efficiently recovering lithium from lithium cobalt oxide which is a positive electrode material for a lithium ion secondary cell, and of recycling the lithium ion secondary cell".

CITATION LIST

Patent Literatures

Patent Document 1: Japanese Patent No. 4581553 B
Patent Document 2: Japanese Patent No. 5535717 B

SUMMARY OF INVENTION

Technical Problem

By the way, in the purification treatment for the lithium compound, the solubility of the lithium compound such as lithium carbonate in water is generally low. Therefore, it is difficult to say that a sufficient amount of the lithium compound is dissolved by repulp washing in the purification treatment. Therefore, there has been room for improvement of increased lithium quality of the lithium compounds by purification.

Further, conventionally, the cell powder obtained by calcining lithium ion secondary cell scrap has been subjected to acid leaching to leach many of the various metal components contained therein, and then subjected to solvent extraction, neutralization, and the like to finally obtain lithium carbonate. However, if only lithium can be recovered in advance from the cell powder by dissolving it in water or the like, this would lead to a drastic simplification of the lithium recovery process. However, conventionally, due to the low solubility of the lithium compound in water, the lithium compound contained in the cell powder could not be effectively dissolved.

Further, according to the proposed technique of Patent Document 2, it mentions that lithium can be efficiently recovered by subjecting the calcined product obtained by calcining the scrap in the predetermined atmosphere to leaching with water. However, with only simply leaching with water, a large amount of the predetermined lithium compound that may be contained in the calcined product is not sufficiently leached, so that a recovery rate of lithium cannot be significantly improved.

An object of the present invention is to solve such problems. One object of the present invention is to provide a method for dissolving a lithium compound, which can improve dissolution of the lithium compound in water or the like to effectively dissolve the lithium compound, and to provide a method for manufacturing lithium carbonate using the same. Another object of the present invention is to provide a method for recovering lithium from lithium ion secondary cell scrap, which can effectively recover lithium from lithium ion secondary cell scrap by a relatively simple process.

Solution to Problem

As a result of intensive studies, the present inventors have found that, separately from the lithium compound, a carbonate ion is fed to water or an acidic solution to be brought into contact with the lithium compound to generate carbonic acid, and the carbonic acid allows to react with the lithium compound to produce lithium hydrogen carbonate, whereby an amount of the lithium compound dissolved is significantly increased. The timing of feeding the carbonate ion to the water or the acidic solution is not particularly limited, and when the lithium compound is added to the water or the acidic solution, the feeding may be carried out before, during and/or after the addition of the lithium compound to the water or the acidic solution.

Based on such findings, a method for dissolving a lithium compound according to the present invention comprises bringing a lithium compound into contact with water or an acidic solution, and feeding, separately from the lithium compound, a carbonate ion to the water or the acidic solution to produce carbonic acid, and allowing the carbonic acid to react with the lithium compound to produce lithium hydrogen carbonate.

In the method for dissolving the lithium compound according to the present invention, it is preferable that the carbonate ion is fed so as to maintain a saturated state of carbonic acid in the water or the acidic solution.

In the method for dissolving the lithium compound according to the present invention, it is preferable that the lithium compound is at least one selected from the group consisting of lithium hydroxide, lithium oxide and lithium carbonate.

In the method for dissolving the lithium compound according to the present invention, it is preferable that the carbonate ion is fed to the water or the acidic solution by blowing a carbon dioxide gas.

In the method for dissolving the lithium compound according to the present invention, it is preferable that a temperature of the water or the acidic solution during production of lithium hydrogen carbonate is from 5° C. to 25° C.

A method for manufacturing lithium carbonate according to the present invention, using any one of the methods for dissolving the lithium compound, comprises producing the lithium hydrogen carbonate and then separating carbonic acid from a solution of the lithium hydrogen carbonate to precipitate a lithium ion in the solution of the lithium hydrogen carbonate as lithium carbonate.

In the method for manufacturing lithium carbonate according to the present invention, it is preferable that after producing lithium hydrogen carbonate, the solution of the lithium hydrogen carbonate is heated to separate carbonic acid as a carbon dioxide gas from the solution of the lithium hydrogen carbonate.

In this case, it is preferable that after producing the lithium hydrogen carbonate, the solution of the lithium hydrogen carbonate is heated at a temperature of from 50° C. to 90° C.

In the method for manufacturing lithium carbonate according to the present invention, the lithium compound comprises crude lithium carbonate, and the method can produce lithium carbonate having a higher lithium quality than that of the crude lithium carbonate.

Further, the present inventors have found that cell powder obtained by calcining lithium ion secondary cell scrap is brought into contact with water or an acidic solution, and a carbonate ion is fed to the water or the acidic solution in addition to the cell powder, whereby lithium in a certain form in the cell powder is very easily dissolved in the water or the acidic solution. In this case, lithium can be effectively recovered from a lithium dissolved solution having a large amount of dissolved lithium. The timing of feeding the carbonate ion to the water or the acidic solution is not particularly limited, and it may be before, during, and/or after the addition of the cell powder to the water or the acidic solution.

Based on the above findings, a method for recovering lithium from lithium ion secondary cell scrap according to the present invention comprises: a calcination step of calcining the lithium ion secondary cell scrap; and a lithium dissolving step of bringing cell powder obtained after the calcination step into contact with water or an acidic solution and feeding, separately from the cell powder, a carbonate ion to the water or the acidic solution to dissolve lithium in the cell powder.

Here, it is preferable that in the lithium dissolving step, the carbonate ion is fed so as to maintain a saturated state of carbonic acid in the water or the acidic solution.

Here, it is preferable that the feeding of the carbonate ion in the lithium dissolving step is carried out by blowing a carbon dioxide gas into the water or the acidic solution.

The method for recovering lithium from lithium ion secondary battery scrap according to the present invention further comprises a lithium precipitating step of separating lithium from a lithium dissolved solution obtained in the lithium dissolving step, and precipitating a lithium ion in the lithium dissolved solution as lithium carbonate.

It is preferable that in the lithium precipitating step, the lithium dissolved solution is heated to separate carbonic acid as a carbon dioxide gas from the lithium dissolved solution.

It is preferable that in the lithium precipitating step, the lithium dissolved solution is heated at a temperature of from 50° C. to 90° C.

It is preferable that in the lithium dissolving step, the water or the acidic solution has a solution temperature of from 5° C. to 25° C.

It is preferable that the cell powder comprises at least one selected from the group consisting of lithium hydroxide, lithium oxide and lithium carbonate.

Advantageous Effects of Invention

According to the method for dissolving the lithium compound of the present invention, the carbonate ion is fed to the water or the acidic solution, separately from the lithium compound, to generate carbonic acid, and the lithium compound is allowed to react with the carbonic acid to generate lithium hydrogen carbonate, whereby the solubility of the lithium compound is increased, and the lithium compound can be effectively dissolved.

Further, according to the method for recovering lithium from lithium ion secondary cell scrap of the present invention, the carbonate ion is fed to the water or the acidic solution, separately from the cell powder, in the lithium dissolving step, so that lithium in a certain form in the cell powder will be very easily dissolved in the water or the acidic solution, and lithium can be effectively recovered from the lithium dissolved solution having dissolved lithium.

BRIEF DESCRIPTION OF DRAWINGS

FIG. 1 is a flowchart showing a method for dissolving a lithium compound according to an embodiment of the present invention.

FIG. 2 is a flowchart showing a method for recovering lithium from lithium ion secondary cell scrap according to an embodiment of the present invention.

FIG. 3 is a graph showing a lithium concentration in a solution at each predetermined temperature in Example 1.

FIG. 4 is a graph showing a result of XRD for residues in Example 2.

DESCRIPTION OF THE PREFERRED EMBODIMENTS

Hereinafter, embodiments of the present invention will be described in detail.
<Method of Dissolving Lithium Compound>

A method for dissolving a lithium compound according to an embodiment according to the present invention includes bringing a lithium compound into contact with water or an acidic solution, and feeding, separately from the lithium compound, a carbonate ion to the water or the acidic solution to generate carbonic acid, and allowing the lithium compound to react with the carbonic acid to produce lithium hydrogen carbonate.
(Lithium Compound)

In the present invention, various solid lithium compounds can be used. For example, typical examples of the lithium compound include lithium carbonate or other lithium compounds obtained when recovering valuable metals from lithium ion secondary cell scrap.

When the valuable metals from the lithium ion secondary cell scrap, the lithium ion secondary cell scrap is calcined to remove a harmful electrolyte, crushing and sieving are then carried out in this order, and cell powder obtained under a sieve of the sieving is then added to a leaching solution to leach it, and lithium, nickel, cobalt, manganese, iron, copper, aluminum, and the like that may be contained in the solution are dissolved in the solution. Subsequently, among the respective metal elements dissolved in the leached solution, valuable metals such as cobalt, manganese and nickel are recovered. More particularly, the leached solution is subjected to solvent extraction or neutralization at a plurality of stages depending on the metals to be separated, and further, each solution obtained at each stage is subjected to stripping, electrolysis, carbonation or other treatments. As a result, a lithium-containing solution containing a lithium ion is obtained. The lithium-containing solution thus obtained is subjected to carbonation by adding a carbonate salt, blowing a carbon dioxide gas, or the like, to obtain crude lithium carbonate which is lithium carbonate having a relatively low lithium quality. A lithium compound including the crude lithium carbonate can be used.

In addition, the cell powder may contain at least one of lithium carbonate, lithium hydroxide, and lithium oxide. Since lithium is dissolved from such cell powder, lithium compounds in such cell powder can be used.

The use of the lithium compounds as described above lead to recycling of metals contained in the lithium ion secondary cell scrap used in mobile phones or various other electronic devices and discarded due to the life of the cell products, manufacturing defect, or other reasons, which is preferable in terms of effective utilization of resources.
(Dissolution of Lithium Compound)

To dissolve the lithium compound as described above, the lithium compound is brought into contact with water or an acidic solution, and a carbonate ion is fed to the water or the acidic solution, separately from the lithium compound, to generate carbonic acid, and the lithium compound is allowed to react with the carbonic acid to produce lithium hydrogen carbonate.

For example, when the lithium compound contains at least one selected from the group consisting of lithium hydroxide, lithium oxide and lithium carbonate, the lithium compound is added to water or an acidic solution together with the feeding of the carbonate ion by blowing a carbon dioxide gas or adding a carbonate salt, whereby, for lithium carbonate, the carbonic acid would be firstly generated by the reaction: $H_2O+CO_2 \rightarrow H_2CO_3$, and lithium hydrogen carbonate would be then generated under the assumed reaction formula: $Li_2CO_3+H_2CO_3 \rightarrow 2LiHoCO_3$. This can facilitate dissolution of lithium carbonate in water or the acidic solution. Also, for lithium hydroxide and lithium oxide, it is presumed that lithium hydrogen carbonate is produced by the reaction: $2LiOH \rightarrow Li_2O+H_2O$ and $Li_2O+H_2CO_3+CO_2 \rightarrow 2LiHCO_3$, $Li_2O+CO_2 \rightarrow Li_2CO_3$ and $Li_2CO_3+H_2CO_3 \rightarrow 2LiHCO_3$. Therefore, these lithium hydroxide and lithium oxide can also be easily dissolved.

Accordingly, to dissolve the lithium compound, it is important to feed the carbonate ion to water or the acidic solution in at least one period of time selected from before, during and after the addition of the lithium compound to the water or the acidic solution. Examples of the method for feeding the carbonate ion include blowing of a carbon dioxide gas into the water or the acidic solution, and adding of the carbonate salt or carbonated water (carbonate-containing solution). Among them, the blowing of the carbon dioxide gas is preferable because it can suppress contamination of impurities and suppress an increase in an amount of the solution, so that the concentration of lithium cannot be diluted. Specific examples of the carbonate salt when the carbonate salt is added include sodium carbonate and the like. In this case, an amount of the carbonate salt added can be, for example, from 1.0 to 2.0 fold molar equivalent, and preferably from 1.0 to 1.2 fold molar equivalent.

From the viewpoint of effectively producing lithium hydrogen carbonate by the above reaction formula, it is preferable to feed the carbonate ion so as to maintain a saturated state of carbonic acid in the water or the acidic solution. This can facilitate generation of lithium hydrogen carbonate, so that an increased amount of lithium compound can be effectively dissolved.

The water or acidic solution used herein can be tap water, industrial water, distilled water, purified water, ion-exchanged water, pure water, ultrapure water, or the like, or mixtures of them with sulfuric acid.

In the case of an acidic solution to which an acid is added, an amount of the acid added is preferably adjusted such that a pH of the lithium hydrogen carbonate solution obtained by dissolving the lithium compound is from 7 to 10. If the pH of the lithium hydrogen carbonate solution is less than 7, metals such as cobalt that may be contained in the cell powder and the like may be dissolved together with the lithium compound, and if the pH is more than 10, aluminum that may be contained may be dissolved out. It should be noted that the acid may be added before, during and/or after dissolving the lithium.

A method of bringing the lithium compound into contact with the water or the acidic solution includes various methods such as spraying, immersing, and dipping. From the viewpoint of reaction efficiency, a method of immersing the lithium compound in water and stirring it is preferred.

A solution temperature at the time of bringing the lithium compound into contact with the water or the acidic solution is preferably 5° C. to 25° C. The solution temperature of the water or acidic solution at the time of contact of a relatively low temperature of that level can lead to more effective generation of lithium hydrogen carbonate having higher solubility as the temperature is lower, in the solution. It is preferable to dissolve the lithium compound such that a lithium concentration in the water or the acidic solution is as close as possible to the solubility of lithium hydrogen carbonate at the predetermined solution temperature.

Here, a pulp concentration can be from 50 g/L to 500 g/L. The pulp concentration means a ratio of dry weight (g) of the lithium compound to an amount (L) of the water or acidic solution to be contacted with the lithium compound.

Due to dissolution of the lithium compound, a dissolution rate of lithium in the water or the acidic solution is preferably from 30% to 70%, or more preferably from 45% to 75%. The lithium hydrogen carbonate solution preferably has a lithium concentration of from 7.0 g/L to 10.0 g/L, and more preferably 8.0 g/L to 9.0 g/L. The lithium hydrogen carbonate solution may contain from 0 mg/L to 1000 mg/L of sodium and from 0 mg/L to 500 mg/L of aluminum.

When the cell powder containing the lithium compound is brought into contact with the water or the acidic solution, residues of the cell powder, which remain without being dissolved in the water or the acidic solution, are removed by solid-liquid separation, and the residues are then subjected to acid leaching, solvent extraction, electrolytic extraction, and other treatments to recover various metals contained therein. Herein, detailed descriptions of the residues are omitted.

(Production of Lithium Carbonate)

After dissolution of the lithium compound as described above, a lithium precipitating step can be carried out by separating carbonic acid from the resulting lithium hydrogen carbonate solution and precipitating a lithium ion in the lithium hydrogen carbonate solution as lithium carbonate.

Here, the lithium hydrogen carbonate solution can be preferably heated at a temperature of from 50° C. to 90° C. to concentrate it, and carbonic acid can be separated as a carbon dioxide gas from the lithium hydrogen carbonate solution. Based on the novel finding that the solubility of lithium hydrogen carbonate is decreased with an increase in the temperature, in the lithium precipitating step, lithium that has been sufficiently dissolved in the lithium hydrogen carbonate solution due to the generation of lithium hydrogen carbonate can be effectively precipitated as lithium carbonate by heating.

If the heating temperature of the lithium hydrogen carbonate solution is lower than 50° C., there is a concern that carbonic acid may not be effectively separated. Therefore, the heating temperature is preferably 50° C. or higher. On the other hand, if the heating temperature is higher than 90° C., a problem may be caused due to boiling. Therefore, the upper limit may be 90° C. From this viewpoint, the heating temperature of the lithium hydrogen carbonate solution is more preferably from 70° C. to 80° C.

Alternatively, it is also possible to add methanol, ethanol, or the like to the lithium hydrogen carbonate solution and carry out separation of carbonic acid using such a non-aqueous solvent. Among them, methanol and ethanol are preferably used as non-aqueous solvents because they are inexpensive. Here, specific examples of the addition method include mixing the non-aqueous solvent with the lithium hydrogen carbonate solution with stirring.

(Purification of Lithium Carbonate)

If a lithium quality of lithium carbonate thus obtained is lower than a target quality, the lithium carbonate can be optionally purified to obtain lithium carbonate having higher quality. As used herein, the target lithium quality of lithium carbonate can be, for example, 16% or more, preferably 17% or more. However, this lithium purification step is not necessarily required.

More particularly, the purification of lithium carbonate is carried out by subjecting lithium carbonate obtained by separation of carbonic acid from the lithium hydrogen carbonate solution to repulp washing, and blowing a carbon dioxide gas into the solution to dissolve carbonic acid in the solution, and then separating calcium, magnesium, and the like from the lithium hydrogen carbonate solution by solid-liquid separation. Subsequently, deacidification and concentration are carried out and the purified lithium carbonate is separated from a filtrate by solid-liquid separation. When the impurity quality in the purified lithium carbonate is higher, it can be further washed.

<Method of Recovering Lithium from Lithium Ion Secondary Cell Scrap>

The method for recovering lithium from lithium ion secondary cell scrap according to an embodiment of the present invention includes at least a calcination step of calcining the lithium ion secondary cell scrap, and a lithium dissolving step of bringing cell powder obtained after the calcination step into contact with water or an acidic solution and feeding, separately from the cell powder, a carbonate ion to the water or the acidic solution to dissolve lithium in the cell powder.

(Lithium Ion Secondary Cell Scrap)

Lithium ion secondary cell scrap targeted by this invention is lithium ion secondary cells that can be used in mobile phones and other various electronic devices and have been discarded due to expired cell product life, production defects or other reasons. It is preferable to recover lithium from such lithium ion secondary cell scrap in terms of effective utilization of resources.

Here, this invention is directed to lithium ion secondary cell scrap containing at least lithium. In an embodiment of this invention, the lithium ion secondary cell scrap generally contains from 0.1% to 10% by mass of lithium.

In general, the lithium ion secondary cell scrap has a housing containing aluminum as an exterior that wraps around the lithium ion secondary cell scrap. Examples of the housing include those made only of aluminum and those containing aluminum, iron, aluminum laminate, and the like.

The lithium ion secondary cell scrap may also contain, in the above housing, positive electrode active materials composed of one or more single metal oxides or two or more composite metal oxides or the like, of lithium, nickel, cobalt and manganese, and aluminum foils (positive electrode substrate) to which the positive electrode active materials are applied and fixed by, for example, polyvinylidene fluoride (PVDF) or other organic binder. In addition, the lithium ion secondary cell scrap may contain copper, iron, or the like.

Further, the lithium ion secondary cell scrap generally contains electrolytic solutions in the housing. For example, ethylene carbonate, diethyl carbonate or the like may be used as the electrolytic solution.

(Calcination Step)

In the calcination step, the lithium ion secondary cell scrap is heated. The calcination step is generally carried out for the purposes of increasing a temperature of the lithium ion secondary cell scrap by heating, removing the internal electrolytic solutions to renders them harmless, and also decomposing the binder that binds the aluminum foils to the positive electrode active materials to facilitate separation of the aluminum foils from the positive electrode active materials during crushing and sieving and increase a recovery rate of the positive electrode active materials recovered under the sieve, and further changing a metal such as lithium and cobalt contained in the lithium ion secondary cell scrap to a form of the metal which can be easily dissolved.

Through the calcination step, lithium in the lithium ion secondary cell scrap will be in the form of lithium oxide, lithium carbonate, lithium hydroxide or the like, and lithium in this form is easily dissolved in the water or the acidic solution. On the other hand, metals such as cobalt are difficult to be dissolved in the water.

By utilizing such a difference of solubility in the water or the acidic solution of the metals contained in the lithium ion secondary cell scrap after the calcination step to carried out a lithium dissolving step as described below, only lithium in the lithium ion secondary cell scrap can be selectively removed to recover lithium at an early stage in processing of the lithium ion secondary cell scrap. As a result, it is possible to prevent substances contained in various reagents that can be used in the processing of lithium ion secondary cell scrap from being mixed into lithium carbonate obtained in the lithium dissolving step, whereby high-quality lithium carbonate is produced.

From such a viewpoint, in the calcination step, the lithium ion secondary cell scrap is preferably heated by maintaining it in a temperature range of from 550° C. to 650° C. for 1 hour to 4 hours. If the heating temperature is too low or the heating time is too short, the change of lithium to a form that is easily dissolved in the water or the acidic solution would be insufficient, and there is a concern that a large amount of lithium cannot be dissolved in the lithium dissolution step. On the other hand, if the heating temperature is too high or the heating time is too long, aluminum deteriorates to become powdered during crushing, and there is a risk that a large number of aluminum will be mixed in the sieved product. In addition, the above temperature is measurable by measuring a surface temperature of the housing of the lithium ion secondary cell scrap.

The calcination step can be carried out by using various heating equipment such as a rotary kiln furnace or other various furnaces, and a furnace for heating in an air atmosphere, as long as the temperature of the lithium ion secondary cell scrap can be controlled as described above.

(Crushing Step)

In this embodiment, after heating the lithium ion secondary cell scrap in the calcination step, a crushing step is carried out by removing positive electrode materials and negative electrode materials from the housing.

In other embodiments, the lithium ion secondary cell scrap after the calcination step can be subjected to a lithium dissolving step as described below. In this case, residues that remain without being dissolved in the lithium dissolving step can be subjected to the crushing step and a subsequent sieving step.

The crushing step is carried out to selectively separate the positive electrode active materials from the aluminum foils to which the positive electrode active materials are applied, while destroying the housing of the lithium ion secondary cell scrap.

Various known apparatuses or devices can be used herein. In particular, it is preferable to use an impact-type crusher that can crush lithium ion secondary cell scrap by applying an impact while cutting. Examples of the impact-type crusher include a sample mill, a hammer mill, a pin mill, a wing mill, a tornado mill, and a hammer crusher. It should be noted that a screen can be installed at an exit of the crusher, whereby the lithium ion secondary cell scrap is discharged from the crusher through the screen when crushed to a size that can pass through the screen.

(Sieving Step)

In this embodiment, after crushing the lithium ion secondary cell scrap in the crushing step, the lithium ion secondary cell scrap is sieved using a sieve having an appropriate opening, for example, for the purpose of removing aluminum powder. Thus, for example, aluminum or copper remains on the sieve, and powdered lithium ion secondary cell scrap from which aluminum or copper has been removed to some extent can be obtained under the sieve.

However, in other embodiments, after the crushing step, the lithium dissolving step as described later can be carried out by dissolving lithium in the lithium ion secondary cell scrap, and in this case, residues remaining without being dissolved in the lithium dissolution step can be subjected to the sieving step.

(Lithium Dissolving Step)

After the calcination step, after the crushing step or after the sieving step, the resulting cell powder is brought into contact with the water or the acidic solution in the lithium dissolving step and a carbonate ion is fed to the water or the acidic solution to dissolve lithium contained in the cell powder in the water. This can provide a lithium dissolved solution containing lithium ions.

In view of handling, the lithium dissolving step is preferably carried out after all of the calcination step, the crushing step, and the sieving step. For example, when the lithium dissolving step is carried out before the crushing step or before the sieving step, it is necessary to dry residues after lithium dissolution.

Here, since the cell powder obtained through the calcination step generally contains at least one selected from the group consisting of lithium hydroxide, lithium oxide and lithium carbonate, the lithium compound is added to water or an acidic solution together with the feeding of a carbonate ion by blowing a carbon dioxide gas or adding a carbonate salt, whereby, for lithium carbonate, the carbonic acid would be firstly generated by the reaction: $H_2O+CO_2 \rightarrow H_2CO_3$, and lithium hydrogen carbonate would be then generated under the assumed reaction formula: $Li_2CO_3+H_2CO_3 \rightarrow 2LiHoCO_3$. This facilitates dissolution of lithium carbonate in the water or the acidic solution. Also, for lithium hydroxide and lithium oxide, it is presumed that lithium hydrogen carbonate is produced by the reaction: $2LiOH \rightarrow Li_2O+H_2O$ and $Li_2O+H_2CO_3+CO_2 \rightarrow 2LiHCO_3$, $Li_2O+CO_2 \rightarrow Li_2CO_3$ and $Li_2CO_3+H_2CO_3 \rightarrow 2LiHCO_3$. Therefore, these lithium compounds can also be easily dissolved.

Accordingly, in the lithium dissolving step, it is important to feed the carbonate ion to the water or the acidic solution in at least one period of time selected from before, during and after the addition of the lithium compound to the water or the acidic solution.

Examples of the method for feeding the carbonate ion include blowing of a carbon dioxide gas into the water or the acidic solution, and adding of the carbonate salt or carbonated water (carbonate-containing solution). Among them, the blowing of the carbon dioxide gas is preferable because it can suppress the contamination of impurities and suppress an increase in an amount of the solution, so that the concentration of lithium cannot be diluted. Specific examples of the carbonate salt when the carbonate salt is added include sodium carbonate and the like. In this case, an amount of the carbonate added can be, for example, from 1.0 to 2.0 fold molar equivalent, and preferably from 1.0 to 1.2 fold molar equivalent.

From the viewpoint of effectively producing lithium hydrogen carbonate by the above reaction formula, it is preferable to feed the carbonate ion so as to maintain a saturated state of carbonic acid in the water or the acidic solution. This can facilitate generation of lithium hydrogen carbonate, so that an increased amount of lithium compound can be effectively dissolved.

The water or acidic solution used herein can be tap water, industrial water, distilled water, purified water, ion-exchanged water, pure water, ultrapure water, or the like, or mixtures of them with sulfuric acid.

In the case of an acidic solution to which an acid is added, an amount of the acid added is preferably adjusted such that a pH of the lithium dissolved solution finally obtained in the lithium dissolving step is from 7 to 10. If the pH of the lithium dissolved solution is less than 7, metals such as cobalt may be dissolved out, and if the pH is more than 10, aluminum may be dissolved out. It should be noted that the acid may be added before, during and/or after dissolving the lithium. A method of bringing the cell powder into contact with the water or the acidic solution includes various methods such as spraying, immersing, and dipping. From the viewpoint of reaction efficiency, it is preferable that the cell powder is immersed in water with stirring.

A solution temperature at the time of bringing the cell powder into contact with the water or the acidic solution is preferably 5° C. to 25° C. The solution temperature of the water or acidic solution at the time of contact of a relatively low temperature of that level can lead to more effective generation of lithium hydrogen carbonate having higher solubility as the temperature is lower, in the solution. It is preferable to leach lithium in the cell powder such that a lithium concentration in the water or the acidic solution is as close as possible to the solubility of lithium hydrogen carbonate at the predetermined solution temperature.

Here, a pulp concentration can be 50 g/L to 500 g/L. The pulp concentration means a ratio of dry weight (g) of the cell powder to an amount (L) of the water or the acidic solution to be contacted with the cell powder.

In the lithium dissolving step, a dissolution rate of lithium in the water or the acidic solution is preferably from 30% to 70%, or more preferably from 45% to 55%.

The lithium dissolved solution preferably has a lithium concentration of from 7.0 g/L to 10.0 g/L, and more preferably 8.0 g/L to 9.0 g/L. The lithium dissolved solution may contain from 0 mg/L to 1000 mg/L of sodium and from 0 mg/L to 500 mg/L of aluminum.

Residues of the cell powder, which remain without being dissolved in the water or the acidic solution, are removed by solid-liquid separation, and they can be then subjected to acid leaching, solvent extraction, electrolytic extraction or other treatments using known methods to recover various metals contained therein. Here, detailed descriptions of the residues are omitted.

(Lithium Precipitating Step)

After the lithium dissolving step as described above, a lithium precipitating step can be carried out by separating carbonic acid from the resulting lithium dissolved solution and precipitating a lithium ion in the lithium dissolved solution as lithium carbonate.

Here, the lithium dissolved solution can be preferably heated at a temperature of from 50° C. to 90° C. to concentrate it, and carbonic acid can be separated as a carbon dioxide gas from the lithium dissolved solution. Based on the novel finding that the solubility of lithium hydrogen carbonate is decreased with an increase in the temperature, in the lithium precipitating step, lithium that has been sufficiently dissolved in the lithium dissolved solution due to the generation of lithium hydrogen carbonate can be effectively precipitated as lithium carbonate by heating.

If the heating temperature of the lithium dissolved solution is lower than 50° C., there is a concern that carbonic acid may not be effectively separated. Therefore, the heating temperature is preferably 50° C. or higher. On the other hand, if the heating temperature is more than 90° C., a problem may be caused due to boiling. Therefore, the upper limit may be 90° C. From this viewpoint, the heating temperature of the lithium dissolved solution is more preferably from 70° C. to 80° C.

Alternatively, it is also possible to add methanol, ethanol, or the like to the lithium dissolved solution and carry out separation of carbonic acid using such a non-aqueous solvent. Among them, methanol and ethanol are preferably used as non-aqueous solvents because they are inexpensive. Here, specific examples of the addition method include mixing the non-aqueous solvent with the lithium dissolved solution with stirring.

(Purification of Lithium Carbonate)

If a lithium quality of lithium carbonate thus obtained is lower than a target quality, the lithium carbonate can be optionally purified to obtain lithium carbonate having higher quality. As used herein, the target lithium quality of lithium carbonate can be, for example, 16% or more, preferably 17% or more. However, this lithium purification step is not necessarily required.

More particularly, the purification of lithium carbonate is carried out by subjecting lithium carbonate obtained by separation of carbonic acid from the lithium dissolved solution to repulp washing, and blowing a carbon dioxide gas into the solution to dissolve carbonic acid in the solution, and then separating calcium, magnesium, and the like from the lithium hydrogen carbonate solution by solid-liquid separation. Subsequently, deacidification and concentration are carried out and the purified lithium carbonate is separated from a filtrate by solid-liquid separation. When the impurity quality in the purified lithium carbonate is higher, it can be further washed.

EXAMPLES

Next, the present invention was experimentally carried out and the effects thereof were confirmed, as described below. However, the descriptions herein are merely for illustrative and are not intended to be limited.

Example 1: Method for Dissolving Lithium Compound

Test Example 1

Reagent grade lithium carbonate having a dry mass of 30 g was added to 300 mL of pure water to form a slurry. The slurry was heated at each of temperatures of 20° C., 30° C., 40° C., 50° C., 60° C., 70° C., and 80° C. Once each temperature was reached, a large excess of carbon dioxide gas was blown for the assumed reaction formula: $Li_2CO_3 + H_2CO_3 \rightarrow 2LiHoCO_3$. After blowing the carbon dioxide gas, the slurry was subjected to solid-liquid separation, and an amount of a filtrate and a lithium concentration in the solution were measured. Results are shown in Table 1 and FIG. 2. Further, the same test was conducted with the exception that no carbon dioxide gas was blown, and a lithium concentration was measured. Results are also plotted in FIG. 2 as "Li Carbonate". Here, the lithium concentration was measured by performing quantitative analysis for the filtrate by means of high frequency inductively coupled plasma atomic emission spectroscopy (ICP-AES).

TABLE 1

| Temperature (° C.) | Solubility of Li Hydrogen Carbonate (g/100 g-H2O) |
| --- | --- |
| 20 | 9.1 |
| 30 | 8.3 |
| 40 | 7.4 |
| 50 | 7.7 |
| 60 | 6.9 |
| 70 | 6.2 |
| 80 | 5.9 |

A filtrate having a lithium concentration of 7.0 g/L obtained at 40° C. was heated at 60° C. for 2 hours with stirring to separate carbonic acid. Solid-liquid separation was then carried out, and an amount of the solution was measured. As a result, there was substantially no decrease in the amount of the solution due to volatilization, and the reduced amount of the solution was of only water adhering to the generated precipitate. A concentration of lithium in the filtrate after the separation of carbonic acid was 5.0 g/L, and an amount of lithium decreased from the solution before and after the separation of carbonic acid was 0.65 g. The precipitate was dried and then identified by X-ray diffraction (XRD), revealing that it was lithium carbonate, and the amount of lithium was 0.48 g.

Test Example 2

When dissolving 30 g of lithium carbonate in pure water as in Test Example 1, a plurality of tests where the temperature of pure water was changed were conducted for each of cases where a carbon dioxide gas was fed and the carbon dioxide gas was not fed. Table 2 shows the results. The dissolution rate as shown in Table 2 means a dissolution rate of lithium in pure water, and it was calculated from the residue weight after leaching.

TABLE 2

| Temperature (° C.) | Dissolution Rate % | |
| --- | --- | --- |
|  | CO2 Present | CO2 Absent |
| 20 | 47.9 | 13.0 |
| 30 | 43.7 | 13.0 |
| 40 | 38.6 | 12.0 |
| 50 | 38.5 | 11.0 |
| 60 | 33.0 | 10.0 |
| 70 | 27.9 | 9.0 |
| 80 | 24.9 | 8.0 |

As can be seen from the results shown in Table 2, it is found that the feeding of the carbon dioxide gas significantly increases the dissolution rate of lithium, and this tendency is particularly remarkable when the solution temperature is lower.

As described above, according to the present invention, it was found that lithium carbonate can be effectively dissolved and lithium carbonate having relatively high quality can be obtained. It was also found that the recovery rate of lithium can be further improved by decreasing the temperature as low as possible within the range where coagulation does not occur during the dissolution of carbonic acid, and by increasing the temperature as high as possible during the separation of carbonic acid.

Example 2: Method for Recovering Lithium from Lithium Ion Secondary Cell Scrap

Test Example 1

Cell powder having a lithium quality of 4.1% by mass, obtained by calcining the lithium ion secondary cell scrap, was repulped with pure water such that a pulp concentration was 500 g/L. To the lithium in the cell powder was brown a carbon dioxide gas at one fold molar equivalent in the assumed reaction formula: $Li_2CO_3 + H_2CO_3 \rightarrow 2LiHoCO_3$.

A filtrate having a lithium concentration of 6.2 g/L was then obtained by solid-liquid separation. The filtrate was concentrated by heating at a two-fold volume ratio, and then subjected to solid-liquid separation. The lithium concentration on the solution side was 3.3 g/L. After drying the residue side, qualitative analysis was carried out by X-ray diffraction (XRD). The results are shown in FIG. 2. As shown in FIG. 2, it is found that most of substances contained in the residues are lithium carbonate.

Test Example 2

When dissolving 30 g of lithium carbonate obtained in Test Example 1 in pure water, a plurality of tests where the temperature of pure water was changed were conducted for each of cases where a carbon dioxide gas was fed and the carbon dioxide gas was not fed. Table 3 shows the results. The dissolution rate as shown in Table 3 means a dissolution rate of lithium in pure water, and it was calculated from the residue weight after leaching.

TABLE 3

| Temperature | Dissolution Rate (%) | |
|---|---|---|
| (° C.) | CO2 Present | CO2 Absent |
| 20 | 47.9 | 13.0 |
| 30 | 43.7 | 13.0 |
| 40 | 38.6 | 12.0 |
| 50 | 38.5 | 11.0 |
| 60 | 33.0 | 10.0 |
| 70 | 27.9 | 9.0 |
| 80 | 24.9 | 8.0 |

As can be seen from the results shown in Table 3, it is found that the feeding of the carbon dioxide gas significantly increases the dissolution rate of lithium, and this tendency is particularly remarkable when the solution temperature is lower.

In view of the foregoing, it was found that according to the present invention, lithium can be effectively leached from the lithium ion secondary cell scrap and recovered by a relatively simple process.

What is claimed is:

1. A method for dissolving a lithium compound, the method, comprising bringing a lithium compound into contact with water or an acidic solution, and feeding, separately from the lithium compound, a carbonate ion to the water or the acidic solution to obtain a lithium dissolved solution,
   wherein the lithium compound comprises cobalt, aluminum, and at least one of lithium hydroxide, lithium oxide, and lithium carbonate, and
   wherein a pH of the lithium dissolved solution is from 7 to 10.

2. The method for dissolving the lithium compound according to claim 1, wherein the carbonate ion is fed so as to maintain a saturated state of carbonic acid in the water or the acidic solution.

3. The method for dissolving the lithium compound according to claim 1, wherein the feeding of the carbonate ion is carried out by blowing a carbon dioxide gas into the water or the acidic solution.

4. The method for dissolving the lithium compound according to claim 1 further comprising separating lithium from the lithium dissolved solution, and precipitating a lithium ion in the lithium dissolved solution as lithium carbonate.

5. The method for dissolving the lithium compound according to claim 4, wherein when the lithium ion is precipitated, the lithium dissolved solution is heated to separate carbonic acid as a carbon dioxide gas from the lithium dissolved solution.

6. The method for dissolving the lithium compound according to claim 5, wherein when the lithium ion is precipitated, the lithium dissolved solution is heated at a temperature of from 50° C. to 90° C.

7. The method for dissolving the lithium compound according to claim 1, wherein when the lithium compound is brought into contact with the water or the acidic solution, the water or the acidic solution has a temperature of from 5° C. to 25° C.

* * * * *